United States Patent [19]
Ament et al.

[11] Patent Number: 5,820,187
[45] Date of Patent: Oct. 13, 1998

[54] CARGO SPACE PARTITION BETWEEN A REAR COMPARTMENT AND A CARGO SPACE OF A STATION WAGON INTERIOR

[75] Inventors: Eduard Ament, Aichwald; Holger Seel, Aidlingen, both of Germany

[73] Assignee: Baumeister & Ostler GmbH & Co. KG, Aichwald, Germany

[21] Appl. No.: 701,724

[22] Filed: Aug. 22, 1996

[30] Foreign Application Priority Data

Aug. 25, 1995 [DE] Germany .......................... 195 31 303.8

[51] Int. Cl.[6] .................................................. B60R 5/04
[52] U.S. Cl. ...................... 296/24.1; 296/37.16; 280/749
[58] Field of Search ................... 296/24.1, 97.8, 296/28, 37.16, 37.8, DIG. 1; 160/373, 263, DIG. 2, DIG. 10; 280/748, 749; 428/128

[56] References Cited

U.S. PATENT DOCUMENTS

| | | | |
|---|---|---|---|
| 5,186,587 | 2/1993 | Moore | 410/118 |
| 5,288,122 | 2/1994 | Pilhall | 296/24.1 |
| 5,427,486 | 6/1995 | Green | 410/118 |
| 5,437,474 | 8/1995 | Ament | 280/749 |
| 5,551,726 | 9/1996 | Ament | 280/749 |
| 5,632,520 | 5/1997 | Butz | 296/24.1 |
| 5,695,217 | 12/1997 | Ament et al. | 280/749 |
| 5,702,143 | 12/1997 | Shimazaki | 296/24.1 |

FOREIGN PATENT DOCUMENTS

| | | |
|---|---|---|
| 7037962.3 | 2/1971 | Germany . |
| 2050331 | 4/1972 | Germany . |
| 2054799 | 5/1972 | Germany . |
| 433128A1 | 3/1995 | Germany . |

OTHER PUBLICATIONS

Office Action Sep. 1995 Germany.

Primary Examiner—D. Glenn Dayoan
Assistant Examiner—Jason Morrow
Attorney, Agent, or Firm—Evenson, McKeown, Edwards & Lenahan, PLLC

[57] ABSTRACT

A cargo space partition is provided between a rear compartment and a cargo space of a station wagon interior, including a retractable safety net mounted at a rear bench seat in front of the cargo space. Tilt-out elements are assigned to the side edges on both sides of the safety net, which tilt-out elements are movably arranged between an inoperative position and a tilt-out position which at least partially closes the respective free spaces at side edges of the safety net. In the tilt-out position the tilt-out elements project laterally to the outside in the mounting plane of the safety net and can be locked in the respective end positions, to thereby close the otherwise free spaces through which cargo could be thrown.

17 Claims, 5 Drawing Sheets

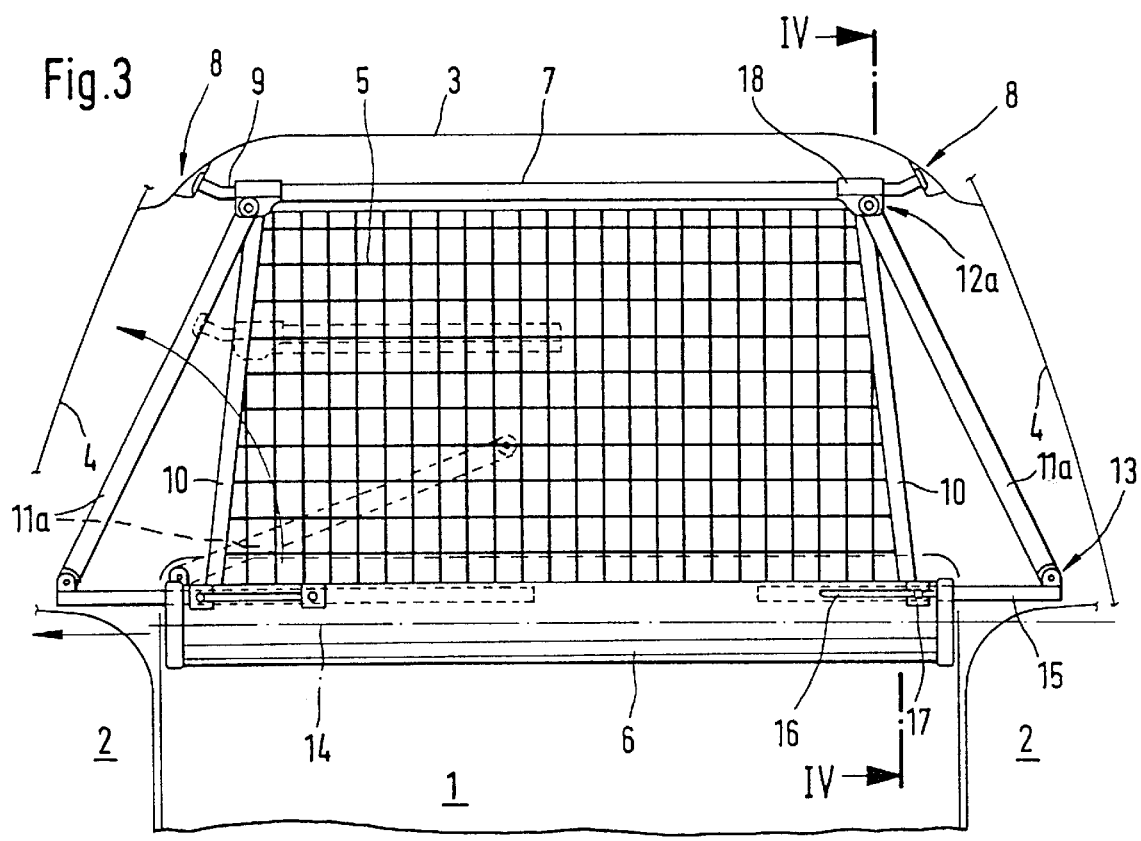
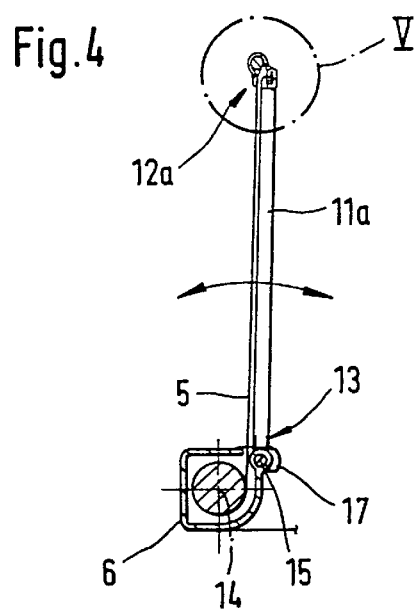
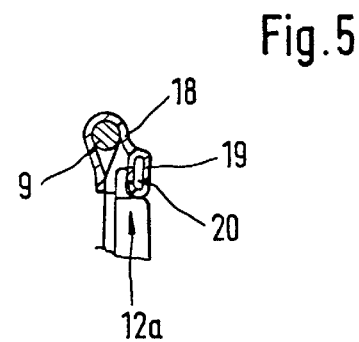

CARGO SPACE PARTITION BETWEEN A REAR COMPARTMENT AND A CARGO SPACE OF A STATION WAGON INTERIOR

BACKGROUND AND SUMMARY OF THE INVENTION

This invention relates to a cargo space partition between a rear compartment and a cargo space of a station wagon interior, having a sturdy safety net which can be pulled out approximately vertically between a rear seat bench rest and a ceiling and whose reinforced side edges are positioned at a distance from the side faces of the interior while leaving a respective free space.

Cargo space partitions of this type are known for station wagons. Such a cargo partition has a cassette housing in which a safety net is arranged which can be rolled on and off a roller. The safety net can be pulled out approximately vertically upwards through a slot on the top side of the cassette housing. The cassette housing is arranged on a rear side of the rest of the rear seat bench. The free front edge of the safety net which can be pulled out is arranged on a carrier rod which can be hung into vehicle-fixed holding devices in the area of the ceiling. The safety net can be pulled approximately vertically out of the cassette housing and can be locked by means of the carrier rod in the area of the ceiling so that, in the pulled-out condition, that is, in its safety position, the safety net provides a partition between the rear compartment and the cargo space. The safety net has a sturdy design and reinforced side edges in the form of belt bands. On both sides of the safety net, that is, between the side edges of the safety net and the assigned side faces of the interior, for constructive reasons, a respective free space remains in the case of the known cargo space partitions through which pieces of luggage or other cargo may reach the rear compartment from the cargo space in the event of a high deceleration of the motor vehicle because of a vehicle impact or similar event and may endanger the safety of the vehicle occupants.

It is an object of the invention to provide a cargo space covering of the initially mentioned type by means of which the safety of the vehicle occupants is improved particularly in the area of the rear compartment.

This object is achieved according to preferred embodiments of the invention in that, on both sides of the safety net, tilt-out elements are assigned to the side edges and the tilt-out elements are arranged in a movable manner between an inoperative position and a tilt-out position which at least partially closes the respective free space and in which they project laterally toward the outside in the mounting plane of the safety net, and can be locked in the respective end positions. By means of the solutions according to the invention, the safety of vehicle occupants is increased particularly in the rear compartment because the cargo space partition is widened as the result of the additional tilt-out elements in the area of the lateral free spaces. By means of the tilt-out elements, the free spaces are reduced to such an extent that at least no fairly large pieces of luggage can be thrown from the cargo space into the rear compartment which may endanger the vehicle occupants.

In certain preferred embodiments of the invention, each tilt-out element has a tilt-out bar which is assigned in the tilt-out position by means of a lower front end, to a bearing housing of the safety net, and is fastened by means of an upper front end in the area of an upper front edge of the safety net and diagonally spans over the free space. As a result, the tilt-out bar already has a sufficient safety function for the blocking of the free space so that, in a simple manner, by means of the tilt-out bar, a widening of the cargo space covering and a reduction of the free spaces can be achieved.

In a further development of the invention, each tilt-out bar can be laterally tilted out in the area of the bearing housing and is arranged in the area of the upper front edge of the safety net at the level of the assigned lateral edge of the safety net. As a result, the tilt-out bar extends diagonally through the free space and can therefore cover a relatively large free surface.

In a further development of the invention, a triangular tilt-out window made of the material of the safety net is formed as the tilt-out element and, in its tilt-out position, is stabilized by an extension arm. By means of this tilt-out window, the stability of the laterally tilted-out area of the cargo space covering is further increased.

In a further development of the invention, an extension pin is disposed on the bearing housing in parallel to the roll-off axis of the safety net in a linearly displaceable manner between an inoperative position and a holding position which fixes the tilt-out bar in its tilt-out position. As a result, in the inoperative position of the tilt-out bar, the cargo space partition has no enlarged width.

Additional advantages and characteristics of the invention are found in the subclaims as well as in the following description of preferred embodiments of the invention which are illustrated by means of the drawings.

BRIEF DESCRIPTION OF THE DRAWINGS

FIG. 3 is a view similar to FIG. 1, showing a second preferred embodiment of a cargo space partition according to the invention;

FIG. 4 is a sectional view of the cargo space partition according to FIG. 3 along the intersection line IV—IV in FIG. 3;

FIG. 5 is an enlarged representation of a cutout V according to FIG. 4;

DETAILED DESCRIPTION OF THE DRAWINGS

Figure 1:
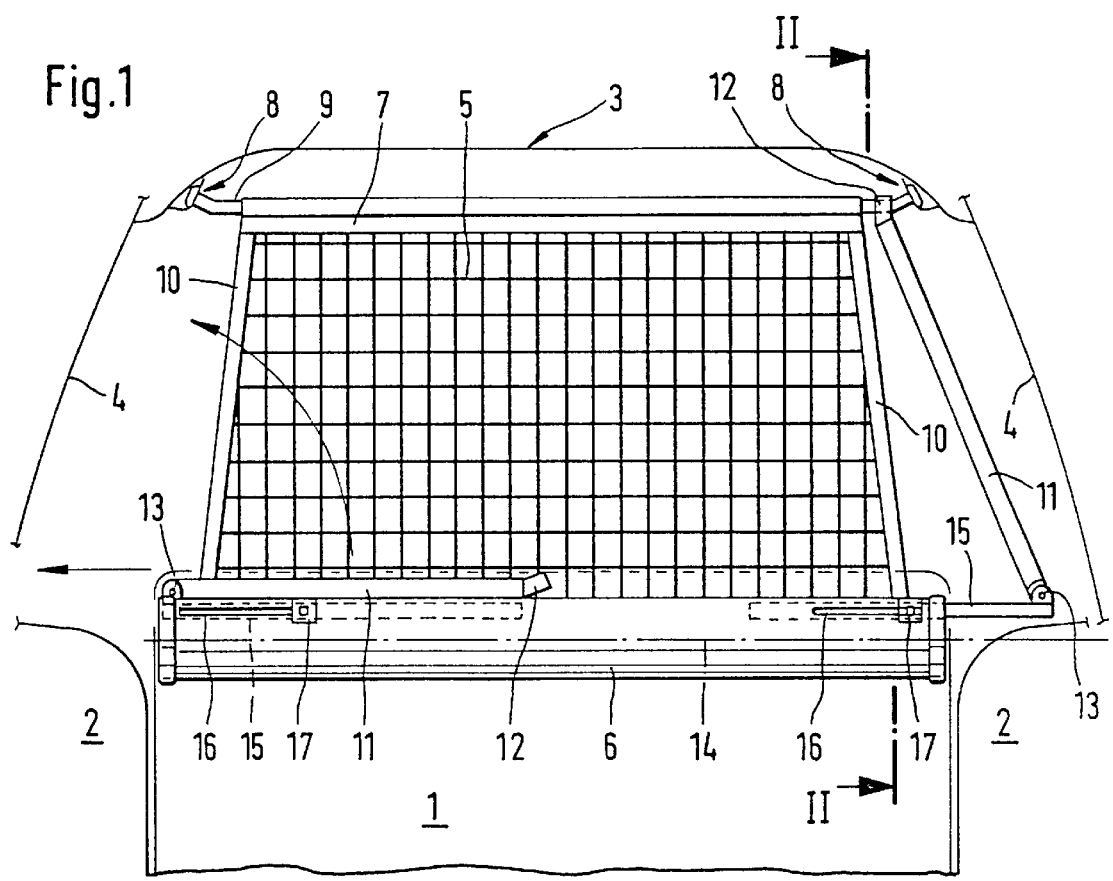
FIG. 1 is a frontal view of a first preferred embodiment of a cargo space partition according to the invention which is arranged on a rear side of a rear seat bench rest of a station wagon of the type schematically depicted in FIGS. 1A and 1B.
Figure 1A:
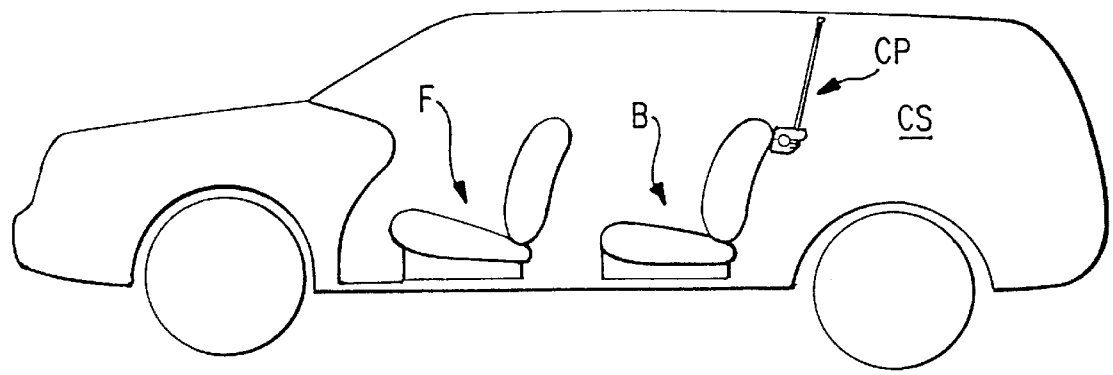
FIG. 1A is a side schematic cut away view of a station wagon, showing the location of the cargo space partition according to preferred embodiments of the invention.
Figure 1B:
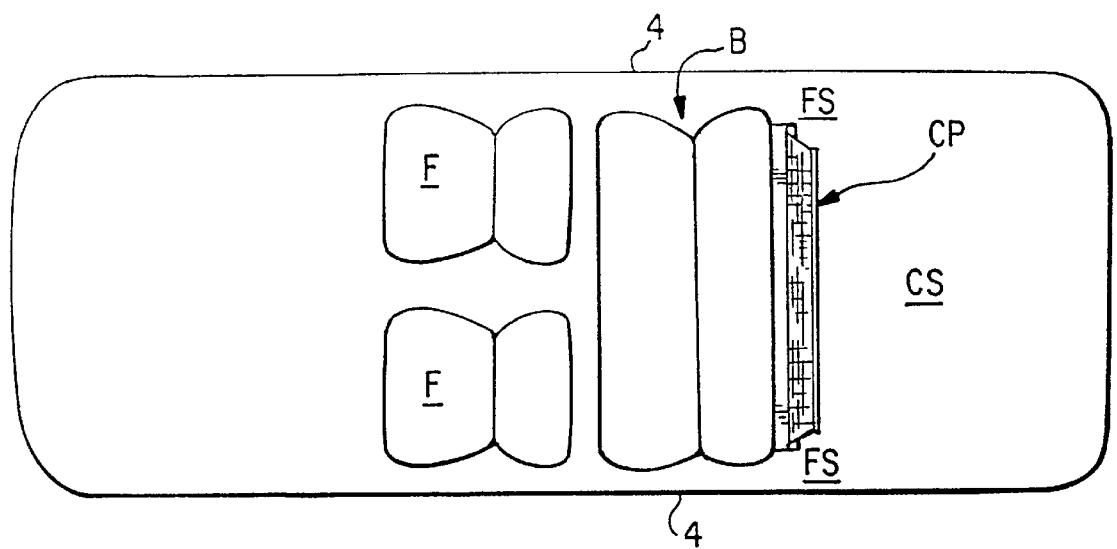
FIG. 1B is a top schematic cut away view of the station wagon of FIG. 1A.

FIGS. 1A and 1B schematically depict a station wagon of the type contemplated for use of the present invention. The station wagon includes front seats F, a rear bench seat B and a cargo space CS behind the rear bench seat B. A cargo partition CP is disposed between the rear seat B and the cargo space CS. The schematic showing of the station wagon in FIGS. 1A and 1B is by way of example only and to show the general orientation of the cargo space partition CP of the present invention with respect to a rear bench seat B and a rear cargo space CS. The lateral free spaces FS are schematically depicted in FIG. 1B. The invention also contemplates use of the cargo space partition in station wagons or other passenger vehicles such as utility vehicles which have more sets of seats in front of the cargo space.

Cargo space partitions (schematically depicted at CP in FIGS. 1A and 1B) according to the invention, as illustrated in the following four embodiments according to FIGS. 1 to 10, are provided for station wagons and separate a cargo space CS from a rear compartment and thus from a passenger compartment of the station wagon. The different representations according to FIGS. 1, 3, 6 and 9 of the cargo space partitions described in detail in the following are all shown in the longitudinal direction of the vehicle and from the direction of the cargo space of such a station wagon. The respective identical parts of all cargo space partitions as well as the relevant parts fixed to the station wagon have identical reference numbers in all four embodiments. All cargo space partitions are fastened to the rear side of a rear seat bench rest 1 which is arranged between two inwardly pulled side wall sections 2. The side wall sections 2 end approximately at the level of the upper edge of the rear seat bench rest 1 and in the upward direction each change into a side face 4 which is formed for the most part of one side window front respectively. A ceiling 3 is provided in the area of the roof of the station wagon.

Each cargo space partition has a cassette housing 6 in which a safety net 5 is disposed so that it can be rolled on and off a roller about a roll-off axis 14. The safety net 5 emerges upwards through a slot in the cassette housing 6 which is not marked in detail and is fastened by means of its free front end 7 on a carrier rod 9 which extends horizontally approximately along the whole width of the cassette housing 6 and can be fixed by a hanging in vehicle-fixed holding devices 8 in the area of the ceiling 3. The safety net 5 has a stable design and has two sturdy side bands 10 along its opposite longitudinal sides which represent the side edges of the safety net 5. In its inoperative position, the safety net 5 is rolled up within the cassette housing 6, the carrier rod 9 resting on the slot of the cassette housing 6. In this inoperative position, the space between the upper edge of the rear seat bench rest 1 and the ceiling 3 which is to be secured is free.

In the safety position of the safety net 5, in which the carrier rod 9 is suspended in the area of the vehicle-fixed holding devices 8, the safety net 5 is pulled upwards approximately vertically and blocks the opening between the rear compartment and the cargo space. However, as illustrated by means of the embodiments shown, also in the safety position of the safety net 5, between the side bands 10 representing the side edges of the safety net 5 and the respective side faces 4—relative to the mounting plane of the safety net 5—a relatively large free space, schematically depicted as FS in FIGS. 1A and 1B, remains in each case laterally toward the outside through which pieces of luggage or other cargo may be thrown out of the cargo space into the rear compartment in the event of high decelerations of the station wagon, because of an impact or the like. In order to avoid this, in the case of all four embodiments, different forms of tilt-out elements are assigned to the side edges of the safety net 5 in its mounted condition which will be described in detail in the following by means of the different embodiments.

Figure 2:
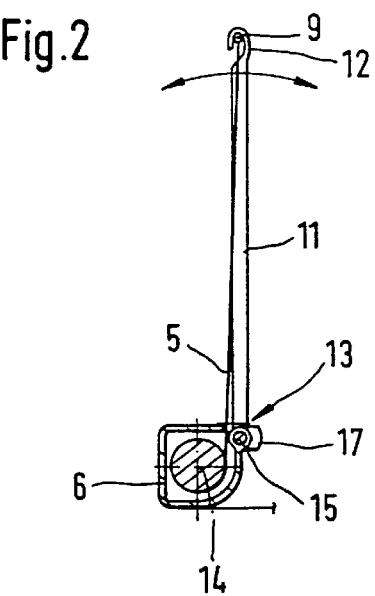
FIG. 2 is a sectional view of the cargo space partition according to FIG. 1 along the intersection line II—II in FIG. 1.

In the first embodiment according to FIGS. 1 and 2, the tilt-out elements each have a tilt-out bar 11 which, in its tilt-out position, extends diagonally through the respective free space between the pertaining side face 4 and the pertaining side band 10. In the tilt-out position, the tilt-out bar 11 is aligned in the mounting plane of the safety net 5. The tilt-out bar 11 has a flat, strip-type plastic profile which, by means of its wide side, is aligned in the mounting plane of the safety net 5. That is the wide flat faces of the bar 11 face toward the front and the rear of the vehicle.

On its lower front end 13, each tilt-out bar 11 is pivotally disposed in the mounting plane on a free end of a guide rod 15 serving as an extension pin. In this case, the tilt-out bar 11 can be pivoted between an inoperative position illustrated in FIG. 1 on the left side and a tilt-out position illustrated on the right side of FIG. 1. Because of the elasticity of the plastic profile, each tilt-out bar 11 can additionally be bent corresponding to the double arrow of FIG. 2 toward the front and toward the rear in order to permit a simple hanging-in of the carrier rod 9 in the case of already hung-in tilt-out bars 11. The reason is that, in its tilt-out position, an upper front end 12 of the tilt-out bar 11, which is constructed to be hook-shaped, is fixed on the carrier rod 9 by means of hanging-in.

The guide rod 15 can be linearly displaced in parallel to the roll-off axis 14 in the cassette housing 6 between an inoperative position illustrated on the left side in FIG. 1 and a tilt-out position illustrated on the right side in FIG. 1. For providing the linear guidance, a longitudinal slot 16 is additionally assigned to the guide rod 15 as a connecting link guide, which extends in the cassette housing 6 in parallel to the roll-off axis, in which connecting link guide a sliding block is guided which is rigidly connected with the guide rod 15 and which merges toward the outside into a grip element 17 for displacing the guide rod 15 manually. As soon as the safety net is changed into its safety position by a pulling-upward of the carrier rod 9, the two tilt-out bars 11 resting on the cassette housing 6 are swivelled by means of the guide of the guide rods 15 in the direction of the arrow toward the outside and are swivelled upwards, in the case of which their upper front ends 15 are hung in on the carrier rod 9. The detaching of the safety net 5 and the changing of the tilt-out bars 11 into their inoperative position takes place in the reverse sequence.

In the second embodiment according to FIGS. 3 to 5, for spanning the free spaces remaining laterally of the safety net 5, tilt-out bars 11a are provided which differ only in the area of their upper front ends 12a and in the area of their bearing on the carrier rod 9 from the previously described embodiment. The guide rods 15 including their corresponding guides in the cassette housing 6 and the pivotability of the tilt-out bars 11a have an identical construction which was illustrated by the selection of identical reference numbers. To this extent, reference is made here only to the description of the embodiment according to FIG. 1 and 2.

On the upper front end 12a of each tilt-out bar 11a, one guide pulley 20 respectively is rotatably disposed whose axis of rotation extends in parallel to the swivel axis of the tilt-out bar 11a in the area of its lower front end 13. In the area of the upper front edge 7 and of the carrier rod 9, as an extension of each side band 10, one bearing part 18 respectively is provided for receiving the guide pulley 20 and which has a corresponding hollow receiving profile 19. The hollow receiving profile 19 is open toward the interior in the direction of the safety net 5 so that, by means of a swivel movement from the inside to the outside, each tilt-out bar 11a can be hung into the corresponding hollow receiving profile 19.

In order to fix the hung-in end position of the tilt-out bar 11a in the bearing part 18, a securing nose is provided in each hollow receiving profile 19 which is constructed in the form of a small leaf spring and acts as a detent spring. When the guide pulley 20 is introduced into the hollow receiving profile 19, the guide pulley 20 moves beyond the securing nose and this securing nose snaps in behind the guide pulley 20 so that the guide pulley 20 is locked in the bearing part 18. However, the detent spring is dimensioned to be only so strong that the guide pulley 20 and thus also the tilt-out bar 11a can be unhooked again from the bearing part 18 by the corresponding expenditure of manual force. Also each tilt-out bar 11a can be swivelled or bent according to the double arrow of FIG. 4 about the longitudinal axis of the guide rod 15 in order to permit a hanging-in of the carrier rods 9 when the tilt-out bars 11a are already locked into the vehicle fixed holding devices 8.

Figure 6:
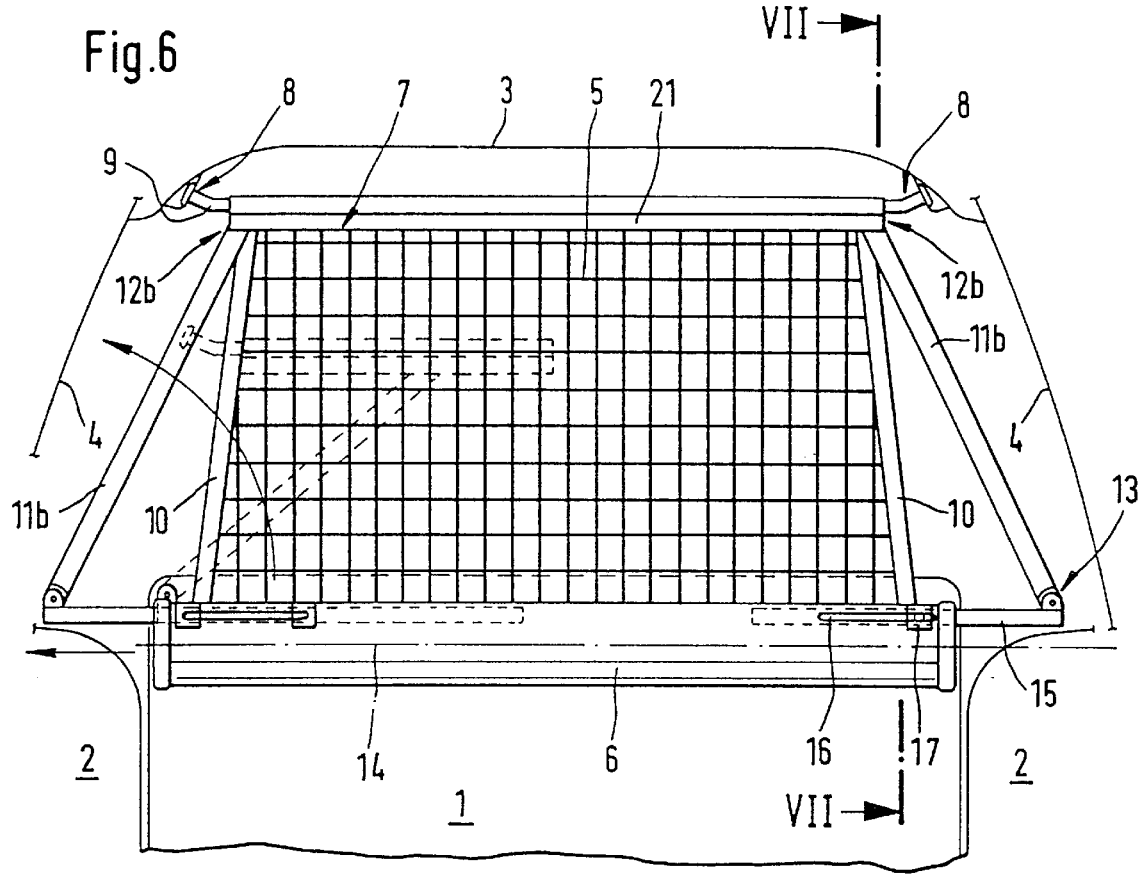
FIG. 6 is a view similar to FIG. 1, showing a third preferred embodiment of a cargo space partition according to the invention.
Figure 7:
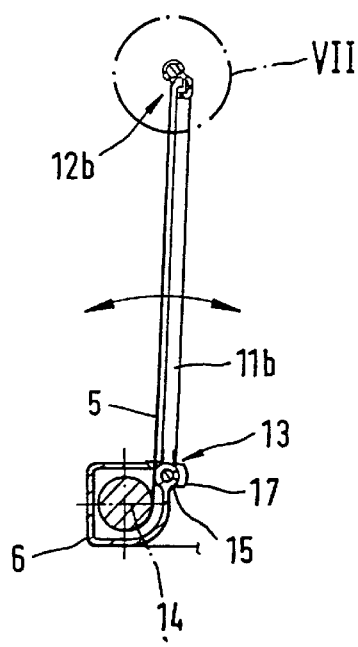
FIG. 7 is a sectional view of the cargo space partition according to FIG. 6 along the intersection line VII—VII in FIG. 6.
Figure 8:
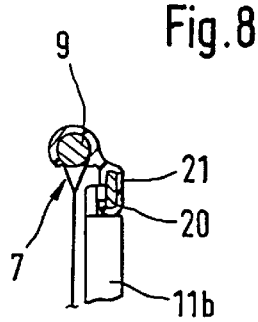
FIG. 8 is an enlarged representation of the cutout VIII in FIG. 7.

The third embodiment according to FIGS. 6 to 8 corresponds in significant parts to the above-described embodiments according to FIGS. 3 to 5. Also in the case of this cargo space partition, tilt-out bars 11b are provided which, in the area of their lower front ends 13 are disposed identically to the above-described embodiments. For this purpose, reference is therefore made to the description of the previous embodiments.

In the area of their upper front ends 12b, the tilt-out bars 11b each have a guide pulley 20 which, to this extent, does not differ from the second embodiment according to FIG. 3 to 5. However, these guide pulleys 20 are disposed in the inoperative position of the tilt-out bars 11b as well as in the tilt-out position, in a guide strip 21 which extends along the whole width of the safety net 5 and the upper front edge 7, the profile of the guide strip 21 corresponding to the hollow receiving profile 19 of the bearing part 18 according to FIG. 5. The guide strip 21 represents a plastic profile which is locked onto the carrier rod 9. During the pulling-up of the safety net 5 and of the carrier rod 9 into the safety position, the guide pulleys 20 of the two tilt-out bars lib slide and/or roll within the hollow profile of the guide strip 21 toward the outside. The two opposite front ends of the guide strip 21 are closed in order to avoid that the guide pulleys 20 and therefore the upper front ends 12b of the tilt-out bars 11b can break out toward the outside.

Figure 9:
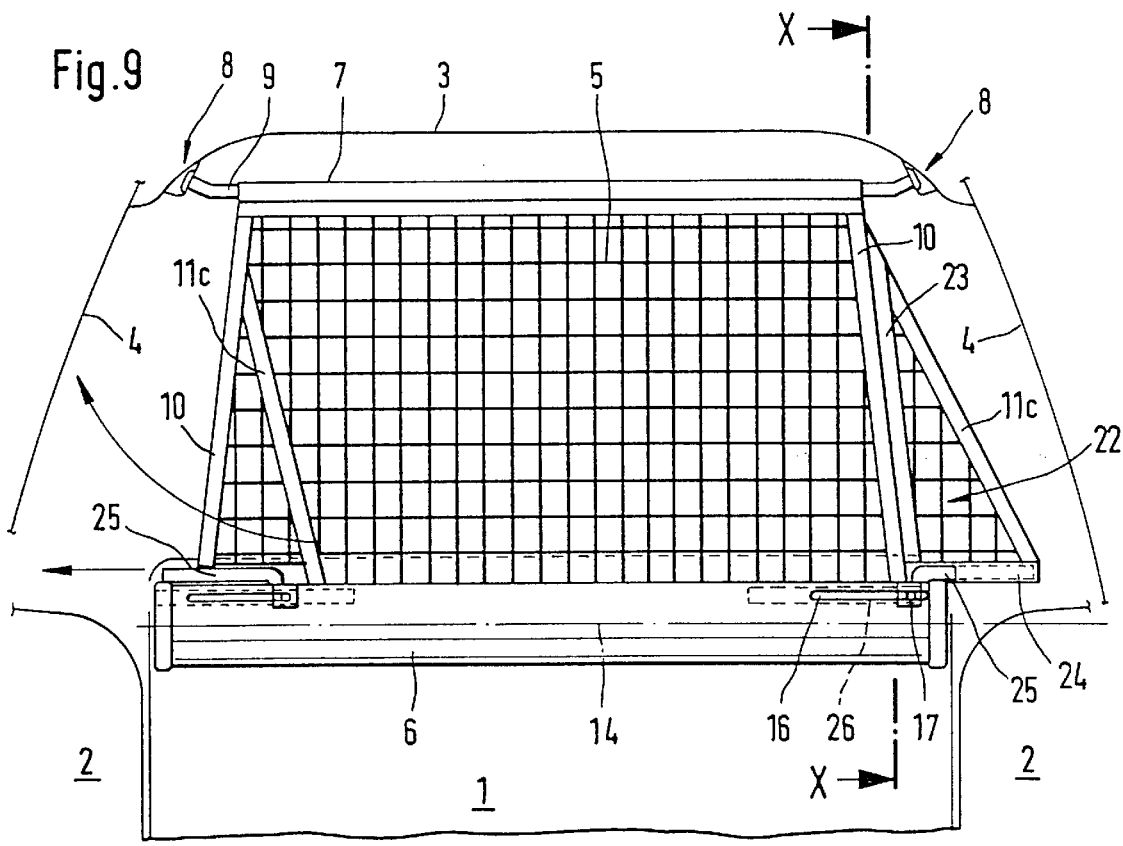
FIG. 9 is a view similar to FIG. 1, showing a fourth preferred embodiment of a cargo space partition.
Figure 10:
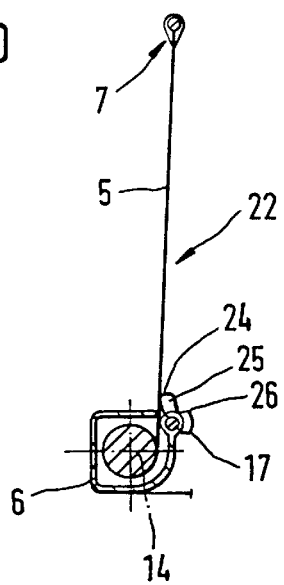
FIG. 10 is a sectional view of the cargo space partition according to FIG. 9 along intersection line X—X in FIG. 9.

The cargo space partition according to the fourth embodiment of FIGS. 9 and 10 has tilt-out elements 11c, 22 which represent triangular, window-type tilt-out tongues. Each tilt-out tongue 11c, 22 is formed of the net material of the safety net 5 and is bordered by sturdy side edges 11c, 23, 24. The side edges 11c, 23, 24 are made of the band material of the side bands 10, in which case the side edge 23 directly adjoins each side band 10. The lower side edge 24 is constructed as a pocket into which extension arm 25 can be pushed. The extension arm 25 is disposed in the cassette housing 6 in parallel to the roll-off axis 14 of the safety net 5 corresponding to the above-described guide rods 15 so that it can be linearly displaced toward the outside. Each extension arm 25 is constructed such that, when being pushed into the pocket 24, it tensions particularly the outer side edge 11c of each tilt-out tongue so that this side edge 11c offers a secure support for pieces of luggage which want to penetrate toward the front through the free space between the side band 10 and the side face 4.

In order to permit a guiding of the extension arm 25 according to the guide rods 15 of the previously described embodiments, each extension arm 25 has a rod-type guide continuation 25 which is guided in the linear guide within the cassette housing 6. In the inoperative position, each tilt-out window according to the representation on the left side of FIG. 9 is folded toward the inside and can be rolled up in the cassette housing 6 together with the safety net 5. After the pulling-out and hanging-in of the carrier rods 9 into the vehicle-fixed holding devices 8, the two tilt-out windows are swivelled toward the outside (see direction of the arrow) and the two extension arms 25 are pushed by means of the grip elements 17 toward the outside and into the pockets 24 of the tilt-out windows 22. The return into the inoperative position takes place correspondingly in the reverse sequence.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Cargo space partition between a rear passenger compartment and a cargo space of a passenger vehicle interior, comprising a safety net, a housing from which the safety net can be pulled out approximately vertically between a rear seat and a ceiling, and reinforced side edges of said safety net which are positioned at a distance from side faces of the interior while leaving a respective free space, wherein tilt-out elements are disposed on both sides of the safety net to the side edges and are movably arranged between an inoperative position and a tilt-out position which at least partly closes the respective free space, the tilt-out elements projecting laterally toward the side faces in a mounting plane of the safety net and being lockable in their respective tilt-out positions.

2. Cargo space partition according to claim 1, wherein said housing is provided to house the safety net in a retracted nonuse position, wherein each tilt-out element has a tilt-out bar which is mounted in the respective tilt-out position, by a lower front end thereof, to the bearing housing of the safety net, and wherein an upper end of each tilt-out bar is fastened relative to an upper front edge of the safety net such that the tilt-out bar diagonally spans the free space when in the tilt-out position.

3. Cargo space partition according to claim 2, wherein each tilt-out bar can be laterally displaced relative to the bearing housing and, at its upper end, arranged at the level of one of the reinforced side edges of the safety net.

4. Cargo space partition according to claim 3, and further comprising a carrier rod for the safety net, each tilt-out bar being detachably fastened at its upper front end on said carrier rod for the safety net.

5. Cargo space partition according to claim 1, wherein each tilt-out element includes a triangular tilt-out window of the material of the safety net and an extension arm which stabilizes the tilt-out window in its tilt-out position.

6. Cargo space partition according to claim 5, wherein the extension arm can be pushed into a pocket on an underside of the tilt-out window.

7. Cargo space partition according to claim 2, wherein an extension pin is disposed on the housing in parallel to a roll-off axis of the safety net in a linearly slidable manner between an inoperative position and a holding position which fixes the tilt-out element in its tilt-out position.

8. Cargo space partition according to claim 7, wherein each tilt-out element includes a tilt-out bar pivotally linked to the extension pin.

9. Cargo space partition according to claim 3, wherein each tilt-out element includes a tilt-out bar pivotally linked to the extension pin.

10. Cargo space partition according to claim 8, wherein each tilt-out element includes a tilt-out bar pivotally linked to the extension pin.

11. Cargo space partition according to claim 2, wherein a detent point is provided on the upper end of each tilt-out bar which detent point can lock the upper end to a carrier rod for the safety net.

12. Cargo space partition according to claim 8, wherein a detent point is provided on the upper end of each tilt-out bar which detent point can lock the upper end to a carrier rod for the safety net.

13. Cargo space partition according to claim 10, wherein a detent point is provided on the upper end of each tilt-out bar which detent point can lock the upper end to a carrier rod for the safety net.

14. Cargo space partition according to claim 2, and further comprising a sliding element on the upper end of the tilt-out bar, and a linear guide which extends parallel to a carrier rod for the safety net in which said sliding element is linearly displaced.

15. Cargo space partition according to claim 8, and further comprising a sliding element on the upper end of the tilt-out bar, and a linear guide which extends parallel to a carrier rod for the safety net in which said sliding element is linearly displaced.

16. Cargo space partition according to claim 10, and further comprising a sliding element on the upper end of the tilt-out bar, and a linear guide which extends parallel to a carrier rod for the safety net in which said sliding element is linearly displaced.

17. Cargo space partition according to claim 1, wherein the vehicle is a station wagon and the rear seat is a bench seat.

* * * * *